A. NARAMOR.

Hay-Rack.

No 58,280.   Patented Sept. 25, 1866.

Witnesses:
Frank Alden
J. Holmes

Inventor:
Andrew Naramor

UNITED STATES PATENT OFFICE.

ANDREW NARAMOR, OF UTICA, MICHIGAN.

IMPROVEMENT IN HAY-RACKS FOR WAGONS.

Specification forming part of Letters Patent No. 58,280, dated September 25, 1866.

*To all whom it may concern:*

Be it known that I, ANDREW NARAMOR, of Utica, in the county of Macomb and State of Michigan, have invented certain new and useful Improvements in Hay-Racks; and I do hereby declare that the following is a full and complete description of the construction and operation of the same, reference being had to the accompanying drawings, making a part of this specification, in which—

Figure 1:
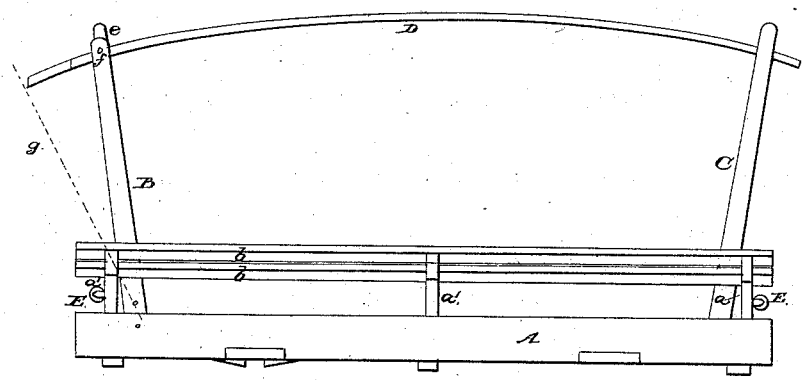
Figure 2:
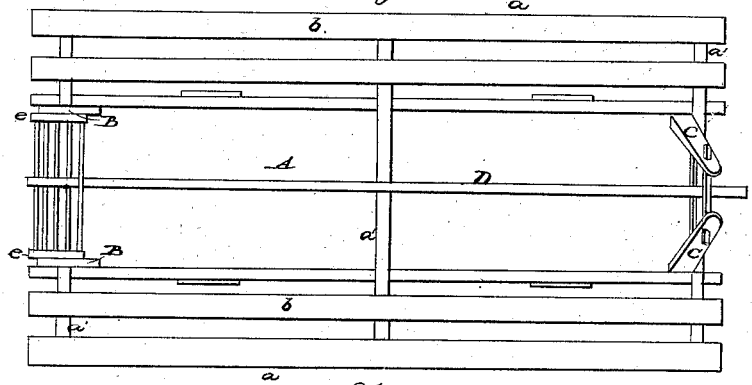
Figure 3:
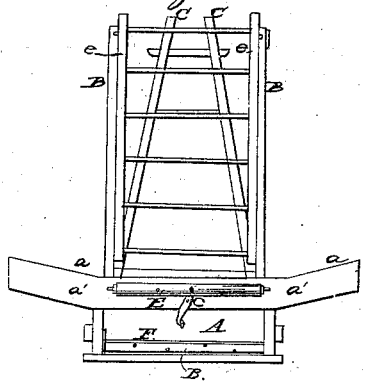

Figure 1 is a side view of the rack. Fig. 2 is a top view of the same. Fig. 3 is an end view.

Like letters of reference refer to like parts in the several views.

A represents the box on which the rack is placed. *a a a* are arms on which the side pieces *b b* are placed. B B are stakes which are pivoted to the box. To these stakes is also pivoted a ladder, *e*, used in ascending the load. C C are stakes pivoted to the opposite end of the box, and connected by two or more braces. D represents the pole which is used to keep the hay in its place. E E are pulleys or windlasses attached to the rack *a*. F is also a pulley attached to the box, there being one on the opposite end also.

The hay is placed on the rack, the end pieces being pivoted to the box and resting against the two outer arms *a a* of the rack, which serve as shoulders to keep them firm. These end pieces keep the hay from pressing out at the ends of the load. When the load is sufficiently large the pole D is placed under a brace of the end piece C; the ladder is unfastened from the stakes B B and turned back into the position shown by the dotted line *g* in Fig. 1. The other end of the pole can be easily placed under any round of the ladder, which can then be raised into its place and again fastened to the stakes by the pin *f*. This binds the load firmly. A large or small load can be secured with equal facility.

The rack may be removed from the box by a rope which is fastened above and attached to the pulleys E E. They can then be turned by placing a bar in the holes and turning them in the manner of a windlass. The box may be removed in the same manner by attaching the rope to the pulleys F F, or the rack and box may be both removed together.

What I claim as my improvement, and desire to secure by Letters Patent, is—

The adjustable stakes B C and ladder *e*, in combination with the rack *a*, box A, and the pulley or windlass at each end, arranged and operating as and for the purpose substantially as set forth.

ANDREW NARAMOR.

Witnesses:
THOMAS J. CARRAN,
T. C. CARRAN.